Nov. 26, 1929.  G. O. CRANK  1,737,493
VEHICLE
Filed June 23, 1928
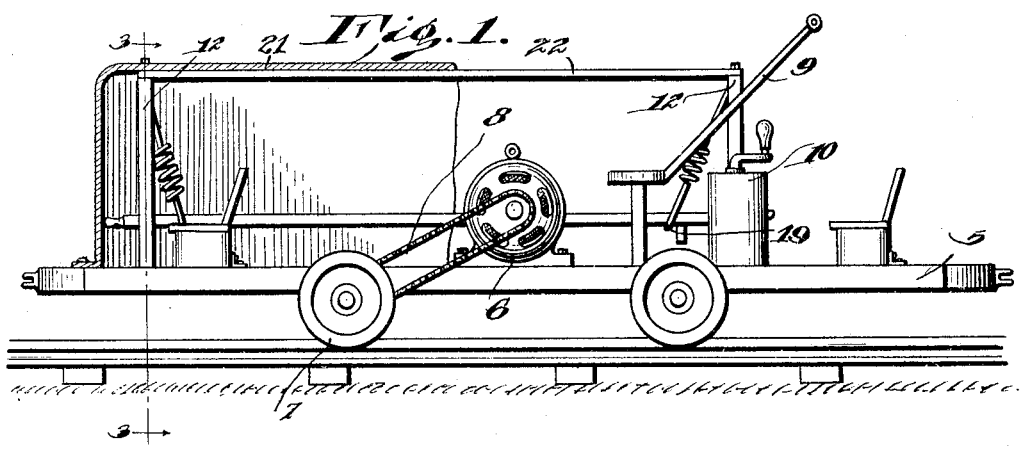
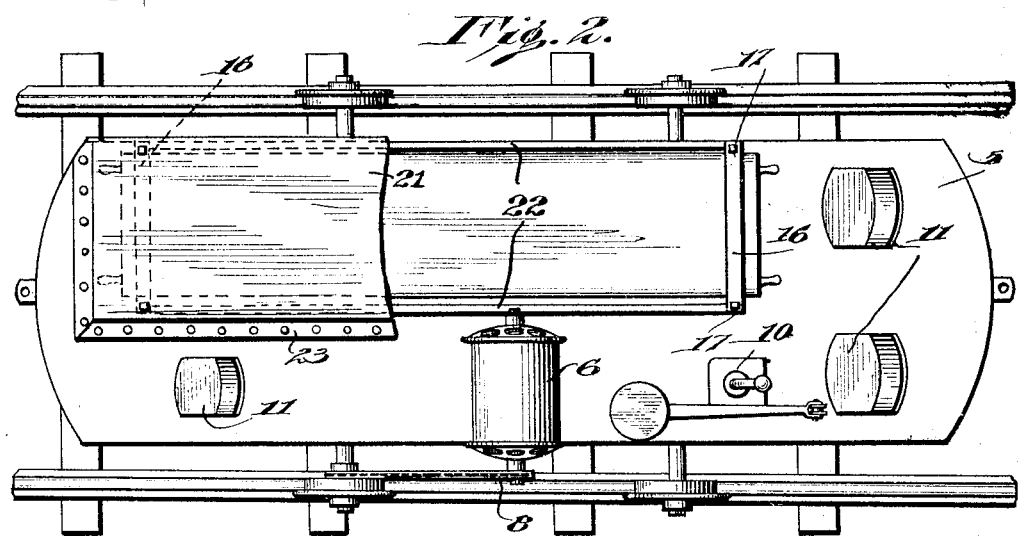
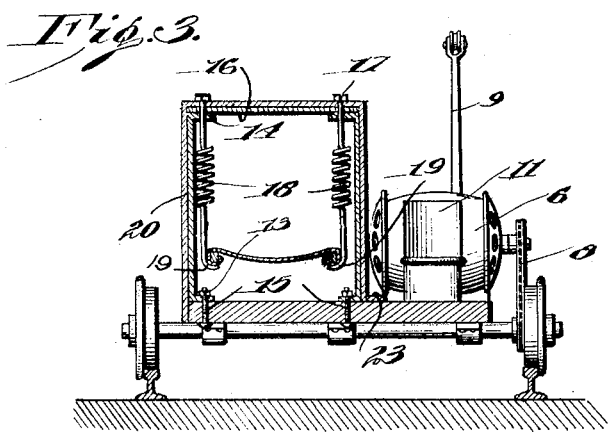
INVENTOR
G. O. Crank,
BY
ATTORNEY Patented Nov. 26, 1929

1,737,493

UNITED STATES PATENT OFFICE

GILBERT O. CRANK, OF LAWTON, WEST VIRGINIA

VEHICLE

Application filed June 23, 1928. Serial No. 287,773.

My invention relates to vehicles and more particularly to ambulances.

An object of the invention is to provide an ambulance for mines whereby patients may be carried comfortably from the point of accident to the exterior of the mine.

Further the invention provides a conveyance of this character whereby the usual litter is resiliently mounted so as to eliminate shocks or jars to the injured person.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a side elevation of my improved mine ambulance,

Figure 2 is a top plan view with parts of the patient compartment broken away, and Figure 3 is a transverse sectional view of the invention.

Referring to the invention in detail a car 5 equipped with an electric motor 6 operatively connected with the drive wheels 7 of the car by a sprocket chain 8, is provided. The usual trolley 9 is carried by the car for supplying electric energy to the motor, while a control mechanism 10 for the motor is arranged to one side of the trolley. Arranged at desirable points on the car is a plurality of seats 11, one of which being arranged directly behind the control mechanism.

For the purpose of supporting a conventional litter, pairs of parallel standards 12 are provided and terminate in lateral extensions 13 and 14. The extensions 13 rest upon the floor of the car and are secured thereto by removable fastenings 15. Cross bars 16 are secured to the extensions 14 of each pair of standards by fastenings 17.

Depending from each of the cross bars is a pair of contractile springs 18, each of which carries a hook 19 at its lower end adapted to engage the side bars of the usual litter, as illustrated in Figure 3. With the litter resiliently suspended, as stated, it will be manifest that the patient reposing thereon will be relieved of shocks and jars incident to the movement of the car over its rails.

To protect the patient against exposure, dripping water, and draft, a water-proof enclosure 20 is provided. This enclosure 20 consists of a sheet of canvas or other water-proof material 21 which extends over horizontal parallel beams 22 supported from the cross bars and has one lower edge detachably fastened to the car floor, as at 23. When it is desired to gain access to the litter, the detachably secured end of the canvas is detached and thrown rearwardly to one side.

What is claimed is:—

In a mine car ambulance the combination with a mine car, pairs of vertical standards arising from the floor thereof, a horizontal bar supported from each pair of standards, and resiliently mounted hook elements depending from the bars and engageable with a litter to resiliently support the same.

GILBERT O. CRANK.